United States Patent [19]

Hattori et al.

[11] 4,084,560
[45] Apr. 18, 1978

[54] ENGINE AIR-TO-FUEL RATIO CONTROL SYSTEM

[75] Inventors: Tadashi Hattori, Nishio; Toshiharu Iwata, Okazaki; Takamichi Nakase, Gamagori, all of Japan

[73] Assignee: Nippon Soken, Inc., Nishio, Japan

[21] Appl. No.: 606,587

[22] Filed: Aug. 21, 1975

[30] Foreign Application Priority Data

Aug. 24, 1974 Japan .................................. 49-97287

[51] Int. Cl.² ........................................... F02M 23/04
[52] U.S. Cl. .......................... 123/119 EC; 123/119 D; 123/124 B
[58] Field of Search ........... 123/119 D, 119 E, 124 B, 123/124 R, 119 R, 32 EA, 119 EC; 261/63, DIG. 19

[56] References Cited

U.S. PATENT DOCUMENTS

| 3,721,222 | 3/1973 | Shioya et al. ................ 123/124 B X |
| 3,738,341 | 6/1973 | Loos ............................ 123/119 E X |
| 3,745,768 | 7/1973 | Zechnall et al. ......... 123/119 E UX |
| 3,759,232 | 9/1973 | Wahl et al. ................... 123/119 D X |
| 3,921,612 | 11/1975 | Aono ................................ 123/119 R |
| 3,970,052 | 7/1976 | Andoh ......................... 123/119 D X |

Primary Examiner—Charles J. Myhre
Assistant Examiner—Ira S. Lazarus
Attorney, Agent, or Firm—Cushman, Darby & Cushman

[57] ABSTRACT

A system for controlling an air-to-fuel ratio of a gas mixture supplied to a vehicle engine to a correct valve is disclosed. In response to an output signal from a discriminator circuit which receives as inputs thereto a signal from an air-to-fuel ratio detector mounted in an exhaust pipe and simultaneously in response to a signal from an aperture detector which detects the aperture of a control valve mounted in an adjusting air path provided parallel to a carburetor, a pulse motor for adjusting the aperture of the control valve provided in said air path is driven to obtain a correct air-to-fuel ratio.

6 Claims, 13 Drawing Figures

ENGINE AIR-TO-FUEL RATIO CONTROL SYSTEM

BACKGROUND OF THE INVENTION

1. Field of the Invention

It is necessary to always properly control the air-to-fuel ratio of a gas mixture supplied to an engine when considering the problems of countermeasure against engine exhaust gas and fuel consumption. The present invention relates to an engine air-to-fuel ratio control system which satisfactorily meets such requirements.

2. Description of the Prior Art

In the past, a gas mixture supplied to a combustion chamber of an internal combustion engine has been maintained richer than gas mixture having an optimum air-to-fuel ratio (A/F) which assures perfect combustion, in order to assure positive ignition of the gas mixture. Such gas mixture exhibited imperfect combustion resulting in noxious gases such as carbon monoxide (CO) and hydrocarbon (HC), which has recently raised serious social problem. Further, since a relatively rich gas mixture is supplied, fuel consumption is considerable. To overcome the above problems, many approaches have been developed to detect the air-to-fuel ratio by an air-to-fuel ratio detector using a metal oxide semiconductor based on zirconium dioxide ($ZrO_2$) to adjust the gas mixture to have an optimum air-to-fuel ratio.

In this type of air-to-fuel ratio control system, a carburetor is so arranged as to apply air-fuel mixture to an engine, whose air-to-fuel ratio is slightly lower than an optimum ratio, and the air-to-fuel ratio of the mixture supplied to the engine is controlled by auxiliary air being admitted through an auxiliary passage provided in the carburetor in addition to a main passage.

The amount of air supplied through the auxiliary passage is controlled by a bypass valve provided in the auxiliary passage, which is driven by a control circuit responding to an output signal of an air-to-fuel ratio detector mounted in an exhaust pipe of the engine. However, in the above system, because of the system delay, that is, a time delay from the supply of the gas mixture to the detection of the air-to-fuel ratio by the air-to-fuel ratio detector, a problem has occurred in that as the rate of opening of the control valve is increased the air-to-fuel ratio rapidly converges to the required air-to-fuel ratio during high load, high speed operation or during transient state but the control range thereof is widened particularly during low load and low speed operation.

SUMMARY OF THE INVENTION

It is an object of the present invention to overcome the above drawbacks of the prior art and to provide an air-to-fuel ratio control system in which when the aperture of the control valve is small, the valve opening rate (control rate or control speed) is reduced and when the aperture is large, the valve opening rate is increased so that the air-to-fuel ratio control range can be narrowed from the high load and high speed operation to the low load and low speed operation and at the same time a high responsibility is assured even in the transition state.

According to the system of the present invention, a drive pulse frequency of a pulse motor is rendered lower in the low load and low speed area of the engine while the frequency is rendered higher in the high load and high speed area. In this manner the rotational speed of the pulse motor can be controlled and the control range of the air-to-fuel ratio can be narrowed. Further, during the transition state including steady acceleration and deceleration, hunting phenomenon does not occur and a control with high tracking ability and high response can be attained. Thus, under any engine condition, the air-to-fuel ratio can be always maintained at a proper valve and advantageous results are obtained from the viewpoint of the countermeasure for engine exhaust gases and fuel consumption.

DESCRIPTION OF THE PREFERRED EMBODIMENTS

Preferred embodiments of the present invention are explained below with reference to the drawings.

Figure 1:
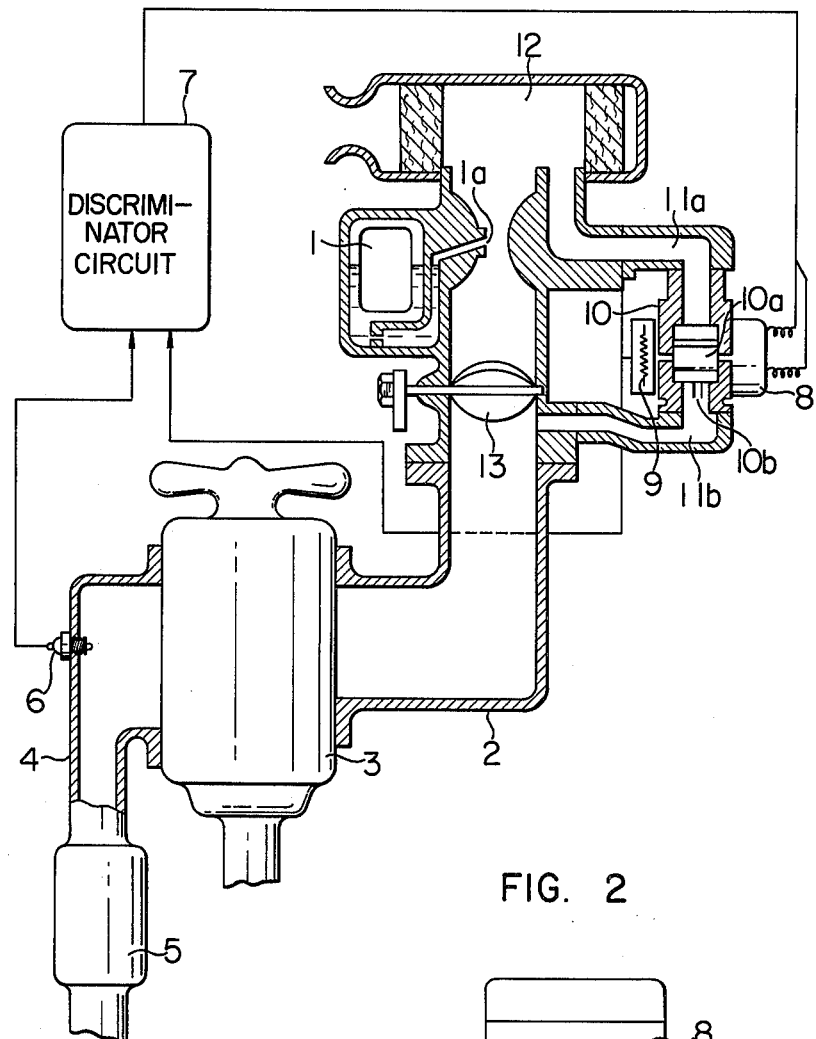
FIG. 1 shows a sectional view of a construction illustrating an embodiment of the present invention.
Figure 2:
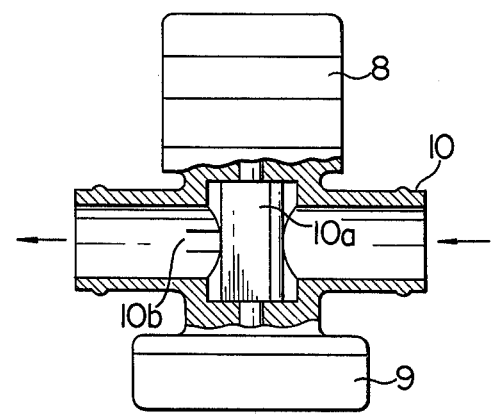
FIG. 2 is a fragmentary sectional view of major portion of FIG. 1.
Figure 3A:
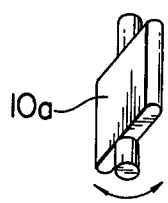
FIG. 3a is a perspective view of a butterfly valve shown in FIG. 2.
Figure 3B:
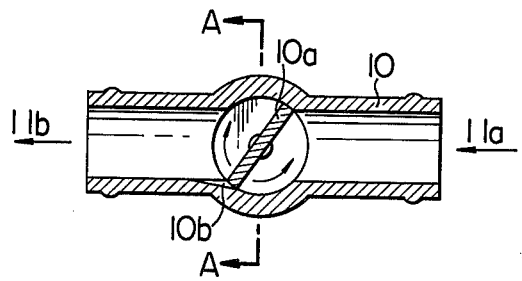
FIG. 3b is a longitudinal sectional view of a valve housing shown in FIG. 2.
Figure 4:
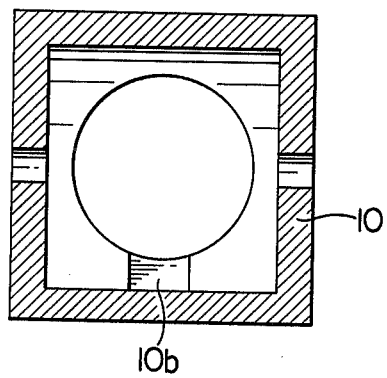
FIG. 4 is a sectional view of the valve housing shown in FIG. 3b, taken along the line A — A.

In FIG. 1, numeral 1 designates a carburetor, 2 an intake pipe of an engine 3, 4 an exhaust pipe of the engine 3, 5 a catalytic converter, 6 an air-to-fuel ratio detector mounted on the exhaust pipe 4 to detect the air-to-fuel ratio, 7 a discriminator circuit, 8 a pulse motor the rotation of which is controlled by an output signal of the discriminator circuit 7. A butterfly valve 10a is coupled to the pulse motor 8 and driven thereby. Numeral 9 designates a potentiometer coupled to the butterfly valve 10a, which detects the opening position of the butterfly valve 10a. Numerals 11a and 11b designate air-to-fuel ratio adjusting air paths, one of which paths 11a connects an air cleaner 12 with a valve housing 10 provided with the butterfly valve 10a while the other of which paths 11b connects the valve housing 10 with a downstream portion of a throttle valve 13 mounted in a main passage for applying air-fuel mixture to engine 3.

FIGS. 2, 3a, 3b and 4 show the valve construction, in which a channel 10b is provided at a portion of the valve housing 10 facing to a tip end of the butterfly valve 10a. The butterfly valve 10a is coupled to the pulse motor 8 and the potentiometer 9. A signal from the air-to-fuel ratio detector 6 is supplied to the discriminator circuit 7, and an output signal thereof is supplied to the pulse motor 8 to control the rotation of the pulse motor 8, thus controlling the opening position of the butterfly valve 10a so as to obtain an optimum air-to-fuel ratio. At the same time, the opening position of the butterfly valve 10a is detected according to the resistance of the potentiometer 9 to enable the operation of the butterfly valve 10a at a proper rate of flow.

Figure 5:
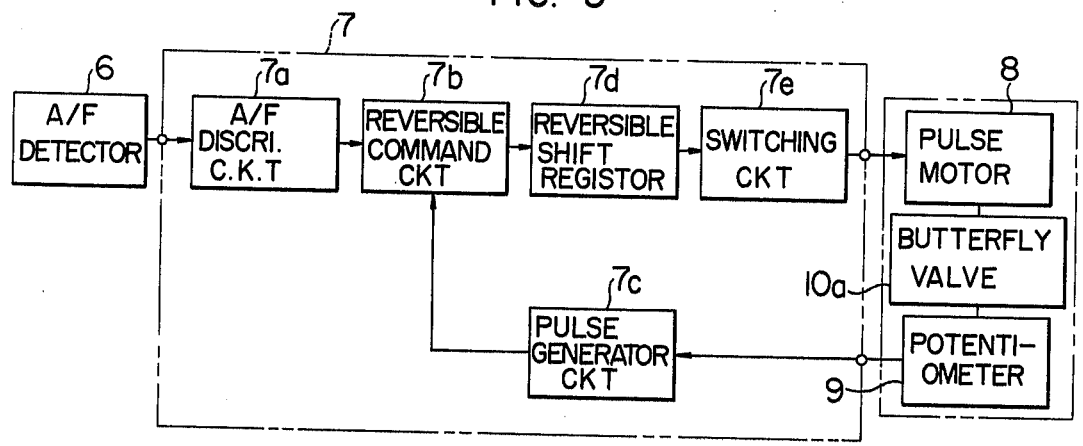
FIG. 5 is a block diagram of a discriminator circuit shown in FIG. 1.
Figure 6:
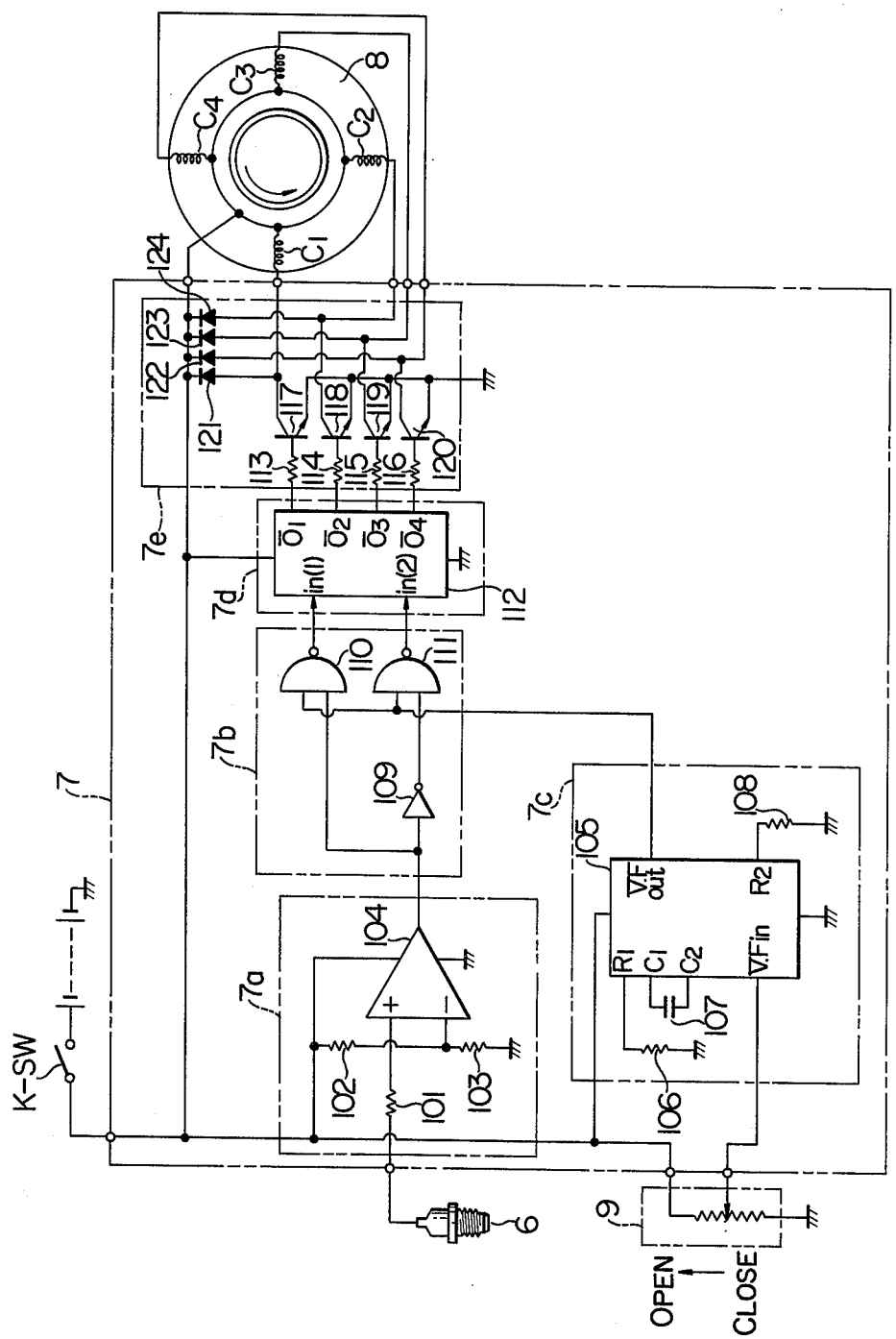
FIG. 6 shows electrical wiring of the discriminator circuit.

FIGS. 5 and 6 show a block diagram and an electrical wiring diagram, respectively, of the discriminator circuit 7. The discriminator circuit 7 comprises an air-to-fuel ratio discriminator circuit 7a, a reversible command circuit 7b, a pulse generator circuit 7c, a reversible shift register 7d and a switching circuit 7e.

The operation of the above construction is explained with reference to the electrical wiring diagram. The carburetor 1 is of conventional structure for regulating the amount of air-fuel mixture and generally does not differ from a known carburetor except that it is conditioned to maintain the air-to-fuel ratio of the mixture slightly richer than the optimum air-to-fuel ratio. Ordinary main air is passed through the carburetor 1 to form air-fuel mixture with fuel in proportion to the amount of air, which is supplied to the engine 3. After the mixture has burnt in the engine, the exhaust gas is exhausted through the exhaust pipe 4 and the catalytic converter 5 to the atmosphere. The air-to-fuel ratio of the air-fuel mixture supplied to the engine is detected by the air-to-fuel ratio detector 6 mounted in the exhaust pipe 4 by detecting oxygen content of the exhaust gas from the engine 3. An output signal from the air-to-fuel ratio detector 6 is supplied to the discriminator circuit 7 where it is determined whether the air-to-fuel ratio of the air-fuel mixture supplied to the engine is higher or lower than the optimum air-to-fuel ratio. If it is lower than the optimum air-to-fuel ratio, that is, if the density of the mixture is richer, the pulse motor 8 drives the butterfly valve 10a mounted in the adjusting air paths 11a and 11b toward the open position (in a direction of opening the valve). Conversely, if the air-to-fuel ratio of the mixture is detected to be higher than the optimum air-to-fuel ratio, that is, if the density of the mixture is leaner, the pulse motor 8 drives the butterfly valve 10a toward the closed position (in a direction of closing the valve). In this manner, by the aid of the compensating air flowing through the adjusting air path, the density of the air-fuel mixture supplied to the engine is adjusted to control the air-to-fuel ratio of the air-fuel mixture to the optimum air-to-fuel ratio.

Figure 7:
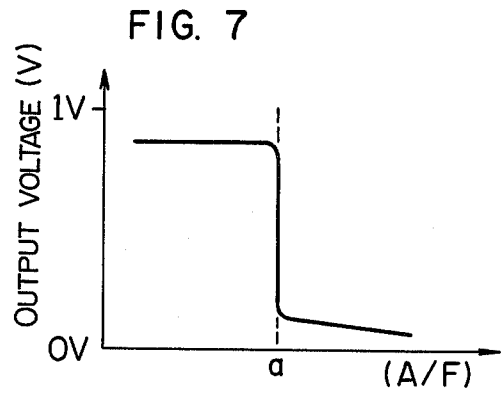
FIG. 7 shows a characteristic curve of the air-to-fuel ratio detector shown in FIG. 1.

Referring to FIGS. 6, 7, 8 and 9, the control operation of the pulse motor 8 is described. In the illustrated embodiment, a zirconium dioxide based metal oxide semiconductor is used as the air-to-fuel ratio detector 6. The characteristic of the output voltage of the detector 6 is shown in FIG. 7, wherein it is noted that a stepwise output voltage is obtained near the optimum air-to-fuel ratio value (point a in FIG. 7). An output signal from the detector 6 is supplied to the air-to-fuel ratio discriminator circuit 7a which comprises resistors 101, 102 and 103 and a comparator 104. The comparator 104 compares the output voltage from the detector 6 with a set voltage determined by resistors 102 and 103 (which set voltage is almost equal to the output voltage of the detector 6 produced substantially at the optimum air-to-fuel ratio). If the output voltage of the detector 6 is higher than the set voltage, that is, if the air-to-fuel ratio of the air-fuel mixture is lower than the optimum air-to-fuel ratio or if the density of the air-fuel mixture is richer, a "1" level signal is produced while if the air-to-fuel ratio of the air-fuel mixture is higher than the optimum air-to-fuel ratio or the density of the air-fuel mixture is leaner, a "0" level signal is produced.

Figure 8:
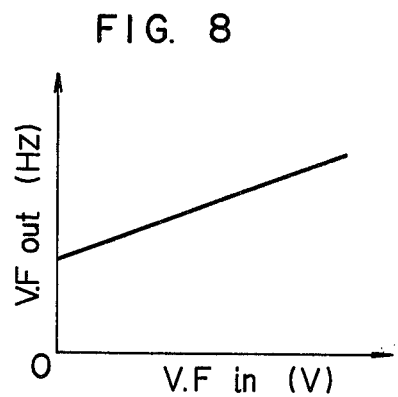
FIG. 8 shows a characteristic curve of an input voltage and an output pulse of a pulse generator shown in FIG. 6.
Figure 9:
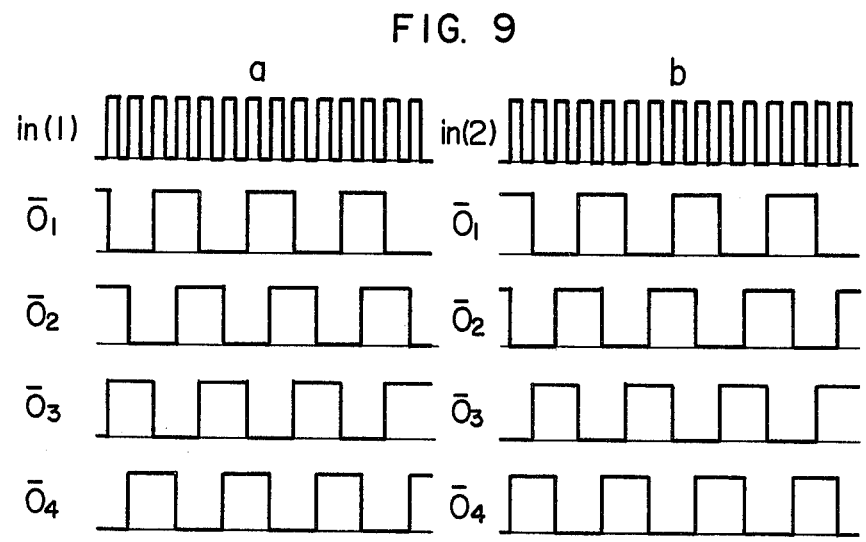
FIGS. 9a and 9b illustrate the operation of a reversible shift register shown in FIG. 6.

The pulse generator circuit 7C comprises a resistor 106 for determining a frequency range of an output pulse generated at an output terminal, a capacitor 107, a resistor 108 for determining an offset pulse frequency (which is a frequency at 0 volt input voltage) and a voltage-to-frequency (V - F) converter 105 (which is, in the illustrated example, CD 4046A of RCA). FIG. 8 shows a characteristic of the V - F converter 105 in which it is noted that as the input voltage increases, the frequency of the output pulse increases. An input terminal VF in of the V - F converter 105 is connected to a slidable contact of the potentiometer 9, which function is to detect the opening position of the butterfly valve 10a. A voltage from a battery is applied across the potentiometer 9 and the slidable contact of the potentiometer 9 is moved in linked relation with the rotation of the butterfly valve 10a to change the resistance between the slidable contact and the ground. The change in resistance is converted to the variation in voltage and the output signal from the potentiometer 9 is applied to the pulse generator circuit 7c. The output characteristic of the potentiometer is such that when the aperture of the butterfly valve 10a is small, the voltage is small and as the aperture increases, the voltage increases. Thus, the output frequency of the pulse generator 7C becomes low when the opening area determined by the opening position of the butterfly valve 10a is small while the frequency becomes high when the opening area is large. The output signal from the air-to-fuel ratio discriminator circut 7a and the pulse signal from the pulse generator circuit 7c are applied to the reversible command circuit 7b to produce forward and backward rotation signals for the pulse motor 8. The reversible command circuit 7b comprises a logic including a NOT circuit 109, NAND gates 110, 111. When the density of the air-fuel mixture is richer, the NAND gate 110 is opened so that a pulse signal is transmitted from an output terminal VF out of the V - F converter 105 of the pulse generator circuit 7c to an input terminal In (1) of the reversible shift register 7d. When the density of the air-fuel mixture is leaner, the NAND gate 111 is opened so that a similar pulse signal is passed to an input terminal In (2) of the reversible shift register 7d. When the pulse signal is applied to the input terminal In (1), the reversible shift register 7d is sequentially shifted to output terminals $O_1$, $O_2$, $O_3$, $O_4$ as shown in FIG. 9a. Conversely, when the pulse signal is applied to the terminal In (2), the output terminals $O_4$, $O_3$, $O_2$, $O_1$, are sequentially shifted as shown in FIG. 9b. The output terminals $O_1$, $O_2$, $O_3$, $O_4$ are connected to a switching circuit 7e which comprises resistors 113, 114, 115, 116, transistors 117, 118, 119, 120, and back e.m.f. absorbing diodes 121, 122, 123, 124. The switching circuit 7e is connected to field coils $C_1$, $C_2$, $C_3$, $C_4$ of the pulse motor 8. When the pulse signal is applied to the input terminal In (1) of the reversible shift register 7d, the transistors 117, 118, 119, 120 are rendered conductive sequentially, and consequently the coils $C_1$, $C_2$, $C_3$, $C_4$ of the pulse motor 8 are also energized sequentially, and a rotor of the pulse motor 8 is rotated in the direction shown by the arrow in the drawing. Namely, when the density of the air-fuel mixture is richer than the optimum mixture density as determined by the optimum air-to-fuel ratio, the pulse motor drives the butterfly valve 10a toward the open position. When the pule signal is applied to the terminal In (2), the condition is reversed and the pulse motor rotates in the counter direction of the arrow shown in FIG. 6 to drive the butterfly valve 10a toward the closed position.

The control range for the air-to-fuel ratio is determined by the control rate of the butterfly valve 10a, that is, the pulse drive frequency of the pulse motor 8 and also determined by the amount of change of the path area provided by the butterfly valve 10a per pulse. Accordingly, in low load and low speed operation since an over-all systematic delay (a time period required for the air-fuel mixture counted from a suction to the engine through the intake manifold to an emission to the exhaust manifold) is large, the pulse drive frequency is set low, whereby the control range can be narrowed by reducing the amount of change of the path area provided by the butterfly valve 10a per pulse. Conversely, in the high load and high speed operation, the over-all systematic delay is small so that the control range is sufficiently small even when the pulse drive frequency is increased and the amount of change of the path area provided by the butterfly valve 10a per pulse is increased. For the transient state such as acceleration or deceleration, the higher the frequency is the more rapidly does the valve 19a converge to a target valve position. Thus, in order to obtain the control of high response without hunting phenomenon, it is necessary to control the system at such a frequency as is compatible with the engine condition.

In the preferred embodiment, since the amount of intake air is small and the amount of adjusting air is small in the low load and low speed operation of the engine, the opening position of the butterfly valve 10a to be controlled or the control position thereof is approximately equal to a fully closed position while it is approximately equal to a fully opened position in the high load and high speed operation of the engine. In this regard, in the low load and low speed operation the pulse drive frequency is rendered relatively low while it is rendered relatively high in the high load and high speed operation. This frequency is determined by the V - F converter 105 of the pulse generator circuit 7c in accordance with the voltage from the potentiometer 9, that is, the opening position of the butterfly valve 10a. It can be set to any desired value taking the response and control ability (control range and hunting) into consideration, so that the control with narrow range of air-to-fuel ratio over all conditions from the low speed operation to the high speed operation and with high response even during the transient operation can be attained.

Further, in the present embodiment, a channel 10b is provided at a portion of the butterfly valve 10a so that the amount of change of the path area per drive pulse to the pulse motor 8 in the low load and low speed operation or near the fully closed position of the butterfly valve 10a is rendered small to reduce the air-to-fuel ratio control range.

While the butterfly valve 10a is used as a control valve in the above embodiment, rotor valve or piston valve may be used similarly.

Figure 10:
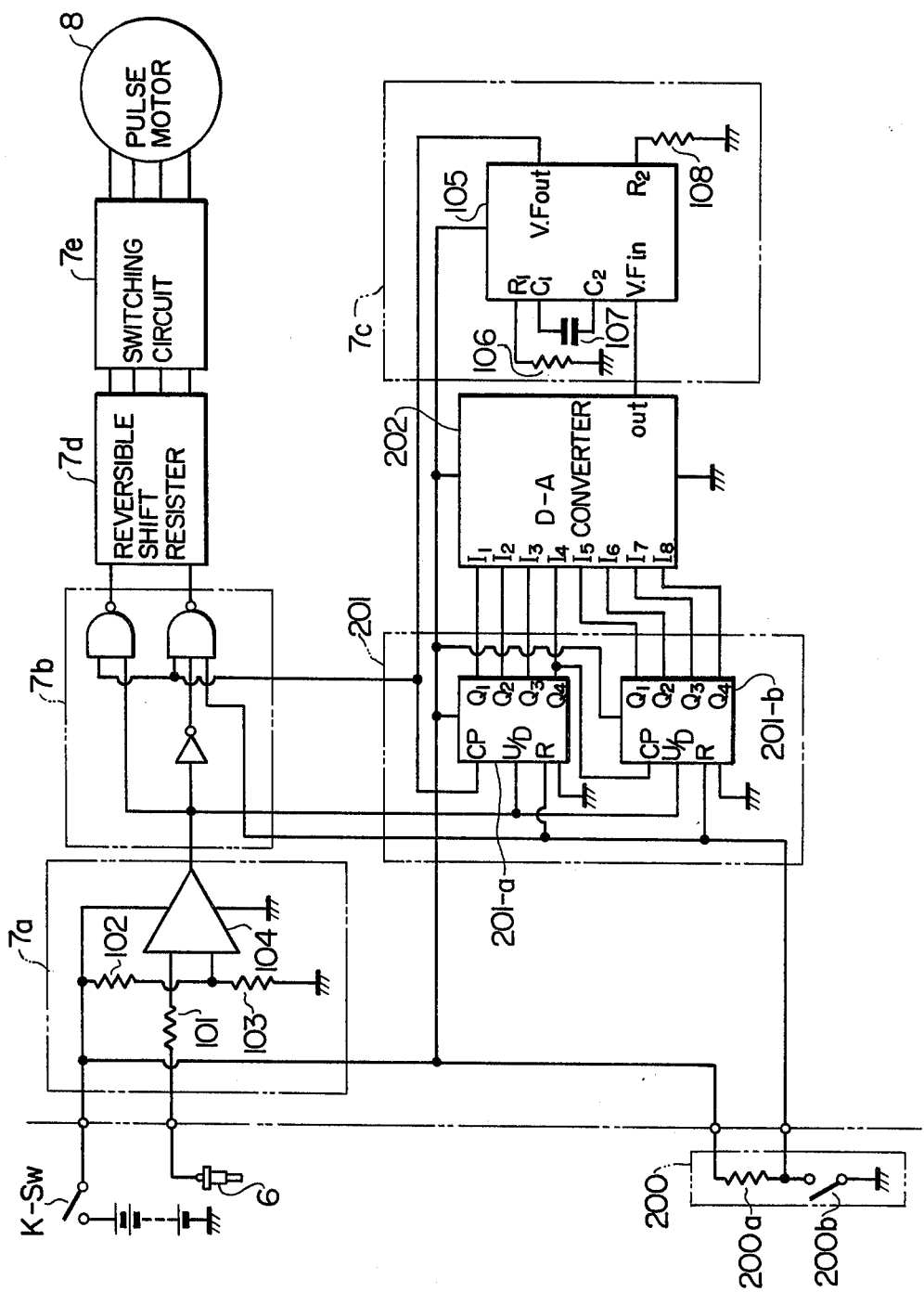
FIG. 10 is an electric wiring diagram of a major portion illustrating another embodiment of the present invention.

While the potentiometer 9 was used as the aperture detector for the control valve in the above embodiment, a fully closed position detection switch 200 for detecting the fully closed position of the control valve, as shown in FIG. 10, may be provided.

In FIG. 10 showing a modification of the present invention, a fully-closed position detecting means 200 is used for detecting a fully-closed position of the control valve 10a. The detecting means 200 includes a resistor 200a and a switch 200b which closes and produces a "O" level signal when the control valve 10a is positioned to its fully-closed position. The output of the fully-closed position detecting means 200 is applied to reset terminals of a reversible counter 201 including Up-Down counters 201a and 201b.

Up-Down terminals U/D of the counters 201a and 201b are connected to the output terminal of the air-to-fuel ratio discriminator circuit 7a. Clockpulse terminals cp of the counters 201a and 201b are connected to the output terminal of the pulse generator circuit 7c.

When a "0" level signal is applied to the reset terminals R of the counters, each output terminal Q1 to Q4 of the Up-Down counters 201a and 201b produces a "0" level signal. Namely, the reversible counter 201 is reset upon an arrival of the "O" level signal at its reset terminals R, thereafter the reversible counter 201 begins to count the clock pulses from the pulse generator circuit 7c in accordance with the output signal at its Up-Down terminals from the air-to-fuel ratio discriminator circuit 7a and then produces an output signal on its output terminals Q1 to Q4, which corresponds to a position of the control valve 10a. More in detail, the Up-Down counters 201a and 201b continue to add the clock pulses from the pulse generator circuit 7c while a "1" level signal is applied to its Up-Down terminals U/D and on the other hand subtracts the clock pulses when a "O" level signal is applied thereto.

Figure 11:
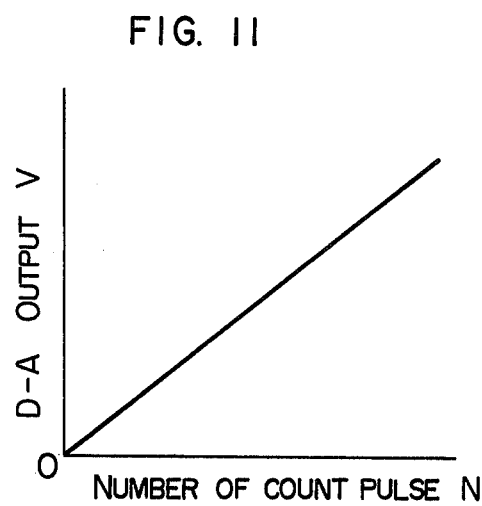
FIG. 11 is a characteristic curve showing a relation between an input and an output of a D - A converter shown in FIG. 10.

The output signal from the reversible counter 201 is applied to a D-A converter 202, wherein each output terminal Q1 to Q4 is respectively connected to each input terminal $I_1$ to $I_8$. The D-A converter 202 produces an output voltage in accordance with the number of clock pulses counted by the reversible counter 201, which has a linear characteristic with respect to the number of clock pulses as shown in FIG. 11, whereby the output voltage of the D-A converter 202 corresponds to the opening position of the control valve 10a since the number of the clock pulses supplied to the D-A converter 202 (counter in the reversible counter 201) correspond to the opening position of the control valve 10a. The output voltage from the D-A converter 202 is applied to the pulse generator circuit 7c, especially to the input terminal $VF_{in}$ of the V-F converter 105 whose function is the same as explained in FIG. 6.

Accordingly the frequency of the clock pulses from the pulse generator circuit 7c is low when the opening angle of the control valve 10a is small and is high when the opening angle thereof is large. Thus the frequency of the clock pulses from the V-F converter is in proportion to the opening angle of the control valve 10a. Such a clock pulse as explained above is applied to the reversible command circuit 7b and thereby the control valve 10a is controlled in such a manner that the control valve 10a is driven faster as the frequency of the clock pulses from the pulse generator circuit 7c is higher, that is, as the opening angle of the control valve 10a is larger. Other operational mode of the modification is the same as that explained in FIG. 6.

Further, while the metal oxide semiconductor based on zirconium dioxide was used as the air-to-fuel ratio detector in the above embodiment, any other means which can detect the air-to-fuel ratio by the change in the rotation of the engine may be similarly used.

What we claim is:

1. An air-to-fuel ratio control system for an internal combustion engine comprising:
   a carburetor connected to an intake pipe of an internal combustion engine for supplying air-fuel mixture to said engine;
   said carburetor including:
   a main passage provided with a throttle valve for controlling the amount of the air-fuel mixture, and
   a bypass passage provided with a bypass valve for compensating air-to-fuel ratio of the air-fuel mixture by controlling the amount of air flowing therethrough;
   an air-to-fuel ratio detecting means mounted in an exhaust pipe of said engine for detecting the air-to-fuel ratio of the mixture supplied to said engine;
   valve position detecting means for detecting a valve position of said bypass valve;
   a bypass valve control circuit connected to said air-to-fuel ratio detecting means and said valve position detecting means in which a bypass valve control signal is produced in accordance with the respective outputs of said air-to-fuel ratio detecting means and said valve position detecting means; and
   driving means coupled to and driving said bypass valve in response to said bypass valve control signal so that the driving speed of said valve increases as the valve opening increases.

2. An air-to-fuel ratio control system as set forth in claim 1, wherein said valve position detecting means comprises;
   a potentiometer coupled to said bypass valve for producing an output voltage corresponding to the opening position of said bypass valve, and
   said bypass valve control circuit comprises; a pulse generator for generating pulse signals whose frequency corresponds to said output voltage from said valve position detecting means; and
   a switching circuit connected to said air-to-fuel ratio detecting means and said pulse generator in which the bypass valve control signal having a frequency corresponding to the frequency of said pulse signals is produced whereby said driving means drives said bypass valve with a control speed corresponding to the frequency of said bypass valve control signal.

3. An air-to-fuel ratio control system as set forth in claim 1, wherein said valve position detecting means comprises;
   a fully-closed position detecting switch coupled to said bypass valve for producing an output signal when said bypass valve is positioned at its fully-closed position, and said bypass valve control circuit comprises;
   a pulse generator for generating pulse signals, the frequency of said pulse signals being changed in proportion to an input voltage supplied to the input terminal of said pulse generator;
   a counter circuit connected to said fully-closed position detecting switch in which said pulse signals is counted in accordance with the output of said air-to-fuel ratio detecting means, said counter circuit being reset for counting by said output signal from said fully-closed position detecting switch;
   a D-A converter connected to said counter circuit for producing an output voltage to be supplied to said input terminal of said pulse generator, the value thereof being in proportion to the number of pulses counted by said counter circuit;
   a switching circuit, connected to said air-to-fuel ratio detecting means and said pulse generator in which the bypass valve control signal having the frequency corresponding to the frequency of said pulse signals is produced whereby said driving means drives said bypass valve with a control speed corresponding to the frequency of said bypass control signal.

4. An air-to-fuel ratio control system as set forth in claim 1 wherein said byapss valve comprises a butterfly valve, and wherein said bypass passage is provided with a channel formed at a portion thereof facing to a tip end of said butterfly valve.

5. An air-to-fuel ratio control system as set forth in claim 1 wherein said bypass valve control circuit comprises discriminator circuit means connected to said air-to fuel detecting means for producing an output signal depending on whether the output of said air-to-fuel ratio detecting means is higher or lower than a predetermined reference value, pulse generator means connected to said valve position detecting means for producing a pulse signal having a frequency which is variable in accordance with the variation of said valve position detecting means, reversible command circuit means connected to both said discriminator circuit means and said pulse generator means for producing forward and reverse rotation command signals in accordance with the output signal of said pulse generator means, reversible shift register means connected to said reversible command circuit means for producing a plurality of output signals which are sequentially shifted in accordance with said forward and reverse rotation command signals, switching circuit means connected to said reversible shift register means for sequentially energizing said drive means.

6. A method for controlling an air-to-fuel ratio of air-fuel mixture to be supplied to an internal combustion engine comprising the steps of.
   applying air-fuel mixture to an internal combustion engine through a main passage;
   controlling the relative proportion of air-to-fuel in the air-fuel mixture being admitted through said main passage in accordance with a commanded position of a throttle valve provided in said main passage;
   measuring oxygen content of the exhaust gases from said engine;
   applying auxiliary air to said engine through a bypass passage;
   controlling the amount of air being admitted through said bypass passage in accordance with the measured oxygen content of the exhaust gases by driving a bypass valve provided in said bypass passage;
   detecting an opening position of said bypass valve; and
   changing a control speed for driving said bypass valve in accordance with the detected opening position of said bypass valve.

* * * * *